United States Patent [19]

Injeyan et al.

[11] Patent Number: 5,796,761
[45] Date of Patent: Aug. 18, 1998

[54] HIGH EFFICIENCY SOLID STATE RAMAN LASER SYSTEM

[75] Inventors: Hagop Injeyan, Glendale; Eric C. Cheung, Torrance; James G. Ho, Los Angeles, all of Calif.

[73] Assignee: TRW Inc., Redondo Beach, Calif.

[21] Appl. No.: 712,251

[22] Filed: Sep. 11, 1996

[51] Int. Cl.$^6$ ..................................................... H01S 3/30
[52] U.S. Cl. ............................. 372/3; 359/327; 372/20; 372/21; 372/29
[58] Field of Search ................ 372/3, 9, 20, 21, 372/22, 25, 29, 30, 39, 41; 359/326, 327

[56] References Cited

U.S. PATENT DOCUMENTS

| | | | |
|---|---|---|---|
| 3,590,266 | 6/1971 | Johnston, Jr. et al. | 359/327 |
| 3,679,999 | 7/1972 | Chernoch | 372/35 |
| 4,048,516 | 9/1977 | Ammann | 372/3 |
| 4,327,337 | 4/1982 | Liu | 372/3 |
| 4,641,312 | 2/1987 | Schäfer et al. | 372/25 |
| 4,852,109 | 7/1989 | Kuchar | 372/34 |
| 4,958,910 | 9/1990 | Taylor et al. | 359/327 |
| 5,099,147 | 3/1992 | Gregor et al. | 359/327 |
| 5,163,061 | 11/1992 | Moberg | 372/29 |

OTHER PUBLICATIONS

Koechner, Walter, *Solid–State Laser Engineering*, Springer Series in Optical Sciences, Editorial Board: D.L. MacAdam, A.L. Schawlow, K. Shimoda, A.E. Siegman, T. Tamir, 1988, pp. 98–103, Springer–Verlag New York. [No Month].

R.P. Johnson et al., paper FP2, Technical Digest, Conference on Lasers and Electro–optics, CLEO 87, "Simple Method for Electronic Feedback Stabilization of an Actively Mode–locked and Q–Switched Nd:YLF Laser," May 1987, pp. 358–359.

*Primary Examiner*—John D. Lee
*Attorney, Agent, or Firm*—Michael S. Yatsko

[57] ABSTRACT

A high efficiency solid state Raman laser system for shifting the frequency of an input beam emitted by a laser pumping system is described. The laser pumping system suppresses relaxation oscillations in the input beam and emits a constant power, mode-locked pulse train. A solid Raman medium is disposed inside a Raman resonator cavity to shift the frequency of the input beam to produce a Raman beam. The frequency of the Raman beam is finely tuned in the resonator cavity to eliminate high order Raman shifted wavelengths. The polarization of the Raman beam is selected using a polarizing element disposed in the resonator cavity. The Raman beam frequency is shifted using a non-linear medium inside the resonator cavity. The non-linear medium is preferably a frequency doubler. The Raman laser system is particularly suitable for producing high-quality yellow light for guide star applications.

41 Claims, 3 Drawing Sheets

HIGH EFFICIENCY SOLID STATE RAMAN LASER SYSTEM

BACKGROUND

The present invention relates to solid state lasers and, more particularly, to a high efficiency solid state Raman laser system.

It is advantageous to be able to produce high quality laser output over a broad range of wavelengths or frequencies. This is because a given wavelength or frequency is commonly most desirable for a given application.

In solid state lasers, there is a relatively small group of effective laser materials, limiting the number of wavelengths and frequencies that can be produced. Accordingly, it is oftentimes difficult to identify a laser material capable of producing a wavelength or frequency that is best suited for a particular application.

A number of methods have been developed for increasing the number of different wavelengths and the frequency range that can be emitted by solid state lasers. These methods increase the range of applications of such lasers. Nonlinear optics, which is based on the nonlinear response of materials to intense electromagnetic radiation, is commonly used in these methods. Nonlinear optical effects occur when the intensity of the radiation incident on a material becomes sufficiently high that the intensity of waves scattered by the material is no longer simply proportional (linear) with respect to the intensity of the incident wave.

Non-linear optical frequency conversion processes include parametric processes and stimulated scattering processes. The parametric processes include harmonic conversion, sum and difference frequency mixing, and parametric oscillation. These parametric processes may be of second and higher order.

Second order harmonic conversion generates a wavelength equal to one-half the incident wavelength, and a corresponding frequency equal to twice that of the incident wave. The doubling of the incident wave frequency is known as frequency doubling. The higher order harmonic conversions increase still further the frequency of the incident wave.

Three-wave sum frequency mixing generates radiation of an increased frequency from two incident wavelengths. Three-wave difference frequency mixing generates radiation of a reduced frequency from two incident wavelengths. These two types of frequency mixing are second order processes. Second order parametric oscillation generates two wavelengths (and frequencies) from an incident wavelength. The generated frequency is lower than that of the incident wave.

An important application of frequency conversion is in the field of telescope optics and, particularly, in uplink atmospheric distortion compensation using the guide star approach. One form of guide star is produced by a laser source emitting at the sodium line. Sodium emits a $D_1$ line at 589.0 nm and a $D_2$ line at 589.6 nm. A laser beam is directed at the mesopheric sodium layer to cause the emission of radiation which is used to compensate for distortions seen by telescopes due to atmospheric aberrations. The sodium line emitted by the laser source is conventionally produced by sum frequency mixing. This technique is inadequate, however, due to the difficulty of maintaining careful control of the pulse timing of the two lasers used to generate the laser output.

Stimulated scattering processes include stimulated Raman scattering ("SRS"). SRS involves the scattering of an incident wave from a Raman medium at a different frequency. The scattered wave has a lower frequency (and longer wavelength) than the incident wave if the Raman medium is initially in its ground state. The scattered wave is termed a Stokes wave. The scattered wave has a higher frequency (and shorter wavelength) than the incident wave if the Raman medium is initially in an excited state, and the scattered wave is termed an anti-Stokes wave. The first generated wave is termed either the first Stokes or first anti-Stokes wave, depending on its frequency. The first generated wave can act as a pump for a second Stokes wave in a second stimulated Raman interaction. Still higher order Stokes waves may also be generated in this same manner. The frequency of each of the second and higher order waves is shifted from that of the first Stokes wave. Accordingly, SRS is a useful technique to produce several wavelengths from a Raman medium by utilizing different Raman shifts. These higher order wavelengths are not always desirable, however, because they lower the intensity of the first Stokes wave and detract from producing the desired output beam intensity.

At high average pump power operation, the heat deposition inherent in the SRS process can produce substantial thermally induced stress and distortion in the Raman active medium. Such stress may induce fracture of the Raman medium. The known Raman laser systems fail to overcome this problem.

The intensity of the input beam used to generate SRS in a Raman medium is an important consideration. To achieve high efficiency in the SRS process, it is desirable to irradiate the Raman medium using a constant power pump pulse. The efficiency of the SRS process is also increased by using a high intensity incident radiation. Harmonic frequency conversion processes also require intense incident radiation fields. If the intensity of the radiation is too high, however, the Raman medium can be optically damaged. For this reason, the input beam intensity should be maintained at an intensity level safely below the damage threshold level of the Raman medium. A safety factor of 2–3 is commonly used for the input beam intensity. The input beam intensity level should also not cause damage to other non-linear optical media present in the Raman laser system. Therefore, to optimize performance, the input beam should have a constant power level throughout the pulse duration, and an intensity that prevents damage to the Raman medium and to other non-linear media in the Raman laser system.

Known long-pulse (i.e., >10 μs) solid-state Raman laser systems lack laser pumping systems capable of supplying an input beam that overcomes the above-described problems. Such laser pumping systems produce outputs which are highly irregular as a function of time due to the occurrence of relaxation oscillations. Relaxation oscillations are caused by the interaction of the oscillation field in the resonator of the laser pumping system and the energy stored in the laser gain medium as a result of the population inversion. Relaxation oscillations produce an output beam that consists of individual spikes of random amplitude, duration and separation. These spikes prevent the production of a constant power pulse and may reach an intensity far exceeding the damage threshold of the irradiated medium.

Relaxation oscillations occur in the following manner. Activating the pump source of the laser pumping system creates a population inversion of N excited-state atoms in the upper laser level. At the steady state condition, the rate of excitation of atoms to the upper laser level equals the rate of depletion and N never exceeds the threshold number of atoms $N_{th}$. For transient conditions, N can exceed $N_{th}$ because no laser oscillation has yet been established and no optical field exists in the resonator cavity to reduce N by stimulated emission. In fact, laser oscillation does not begin to occur until N exceeds $N_{th}$, and the net gain exceeds one. At that point, oscillation increases very rapidly due to the excess of excited atoms and, consequently, the photon flux and the laser light intensity far exceed the steady state levels, producing individual amplitude spikes in the laser output.

As the photon flux becomes very large, the rate of depletion of the excited atoms by stimulated emission also becomes very large, and much greater than the rate of excitation, causing the number of excited atoms to decrease rapidly to below $N_{th}$. The photon flux reaches a maximum at the time N decreases to $N_{th}$. The net gain subsequently drops to below one and the laser light intensity falls below the steady state level. The pump source then again increases N to above the threshold value and the cycle is repeated to produce another laser output spike.

In solid state laser systems, spiking commonly persists over the complete pump cycle without damping down. In addition, spiking tends to be very irregular. Thus, for a laser pumping system that exhibits spiking behavior, it is not possible to produce a constant intensity laser beam output that can be used to irradiate sensitive materials such as solid Raman-active media and other solid non-linear media without the risk of damage.

Therefore, there is a need for a Raman laser system that comprises a laser pumping system capable of producing a smooth, constant power pulse by suppressing relaxation oscillations, and that is maintainable at an effective high intensity level, yet prevents damage to the Raman medium and other non-linear media in the Raman laser system.

There is also a need for a Raman laser system that provides high efficiency conversion to generate a range of wavelengths; that effectively discriminates between first and higher order Stokes waves generated during the SRS process; and efficiently produces high quality yellow light.

SUMMARY

The present invention is a high efficiency Raman laser system that satisfies the above needs. The present invention comprises a laser pumping system that suppresses relaxation oscillations and prevents intensity spiking in the input beam. The laser pumping system produces a laser pulse of constant power that prevents damage to Raman and other non-linear media inside the Raman resonator, and enhances the efficiency of the SRS process and other non-linear frequency conversion processes. Thermal control may be used to prevent thermal distortion of the Raman medium.

The present invention is highly efficient in converting low peak-power pumping pulses to generate a high quality output beam. The output beam may have a range of different wavelengths, depending on the choice of the laser gain medium, the Raman medium, and other non-linear media used in the Raman laser system for frequency conversion. The present invention also provides frequency tuning to control the oscillation frequency of both the laser pumping system and the Raman resonator. This tuning enables the efficient production of high quality light and, particularly, yellow light.

The high efficiency Raman laser system according to the present invention comprises a laser pumping means for generating an input beam. The laser pumping means includes a laser cavity and stabilizing means disposed inside the laser cavity for suppressing relaxation oscillations in the input beam. The Raman laser system further comprises a resonator cavity and an input coupler for inputting the input beam into the resonator cavity. A solid Raman medium is disposed inside the resonator cavity to shift the frequency of the input beam to generate a Raman beam. A solid non-linear medium disposed inside the resonator cavity shifts the frequency of the Raman beam to produce an output beam of a selected wavelength. An output coupler extracts the output beam from the resonator cavity.

The stabilizing means comprises sensing means for sensing the intensity of the input beam, and loss modulating means electrically connected to the sensing means for rapidly modulating the loss of the input beam based on the sensed intensity. The sensing means is preferably a photodetector and the loss modulating means is preferably an acousto-optic modulator. An RF drive generates an RF signal from the electrical signal of the photodetector, and feeds the RF signal to the acousto-optic modulator to control the loss modulation.

The Raman laser system preferably comprises means disposed inside the resonator cavity to tune the frequency of the Raman beam. The tuned Raman beam frequency is shifted by the non-linear medium to produce the output beam.

The laser pumping system preferably comprises a Nd:YAG laser which emits at a wavelength of about 1.064 microns. The input beam is preferably mode-locked. The resonator cavity preferably has a bow tie configuration to maintain short mode-locked pulses. The Raman beam achieves a high intensity which enhances the frequency shifting efficiency of the non-linear medium. Consequently, the present invention achieves high efficiency conversion of the input beam to the output beam.

The solid Raman medium preferably comprises crystalline calcium tungstate, which characteristically shifts the frequency of the input beam from about 1.064 microns to about 1.178 microns. This shifted wavelength equals twice the wavelength of the sodium yellow emission line.

The first frequency selection element preferably comprises a birefringent filter for tuning the frequency of the Raman beam to the first Stokes wave and eliminating higher order Stokes waves from the Raman beam. The second frequency selection element is preferably an etalon which finely tunes the Raman beam frequency to the first Stokes wave. A polarizing element such as an uncoated plate is provided in the resonator cavity to select the polarization of the Raman beam.

The non-linear medium is preferably a frequency doubler which comprises a material selected from the group consisting of LBO, LTBO, CLBO, BBO, KTP, KTP isomorphs including KTA, RTA and RTP, and KD*P. These materials are capable of doubling the frequency of the Raman beam so that it equals the frequency of the sodium yellow emission line.

The output coupler is an output mirror highly transmissive to the wavelength of the output beam and highly reflective to the wavelength of the Raman beam, to ensure that the output beam comprises substantially only the desired wavelength.

DRAWINGS

These and other features, aspects and advantages of the present invention will become better understood from the following drawings, description and appended claims, where:

DESCRIPTION

Figure 1:
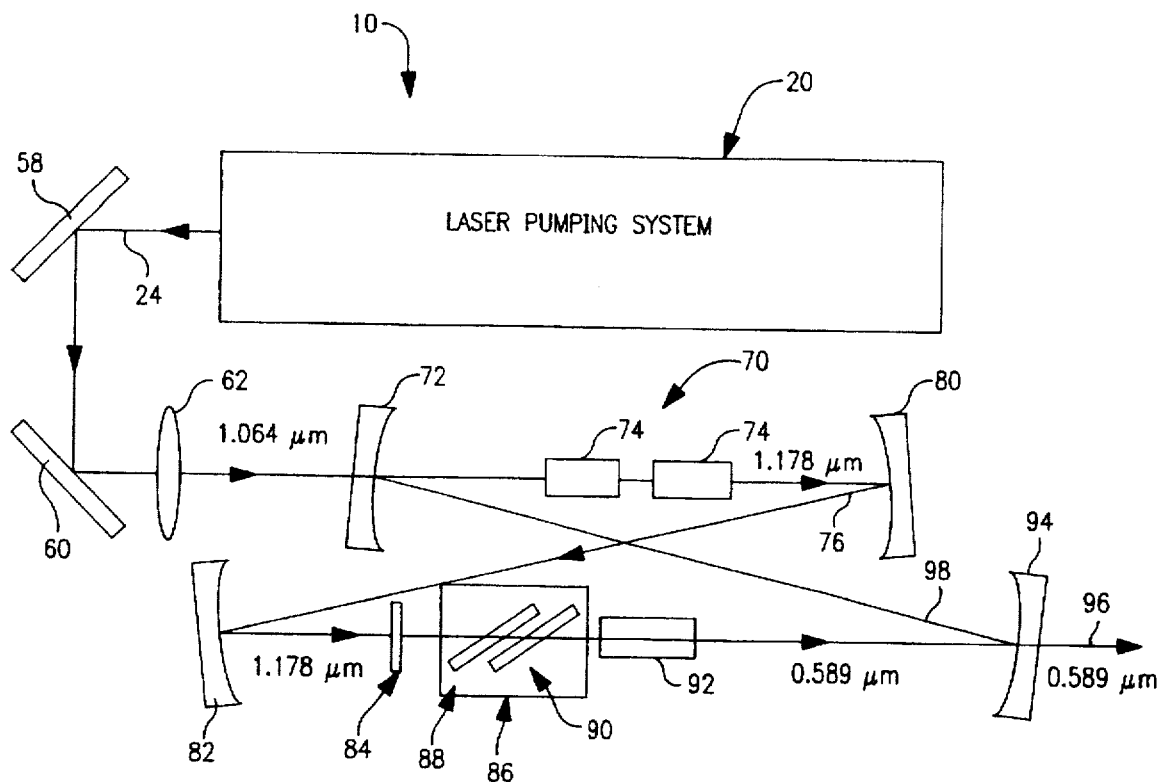
FIG. 1 is a schematic block diagram of a high efficiency Raman laser system according to the present invention.

The present invention is a high efficiency solid state Raman laser system 10 as illustrated in FIG. 1. The Raman laser system 10 comprises a laser pumping system 20 which produces a laser input beam 24, and a Raman resonator 70 in which a Raman medium 74 and a non-linear medium 92 are disposed for shifting the frequency of the input beam to produce an output beam 96.

Figure 3:
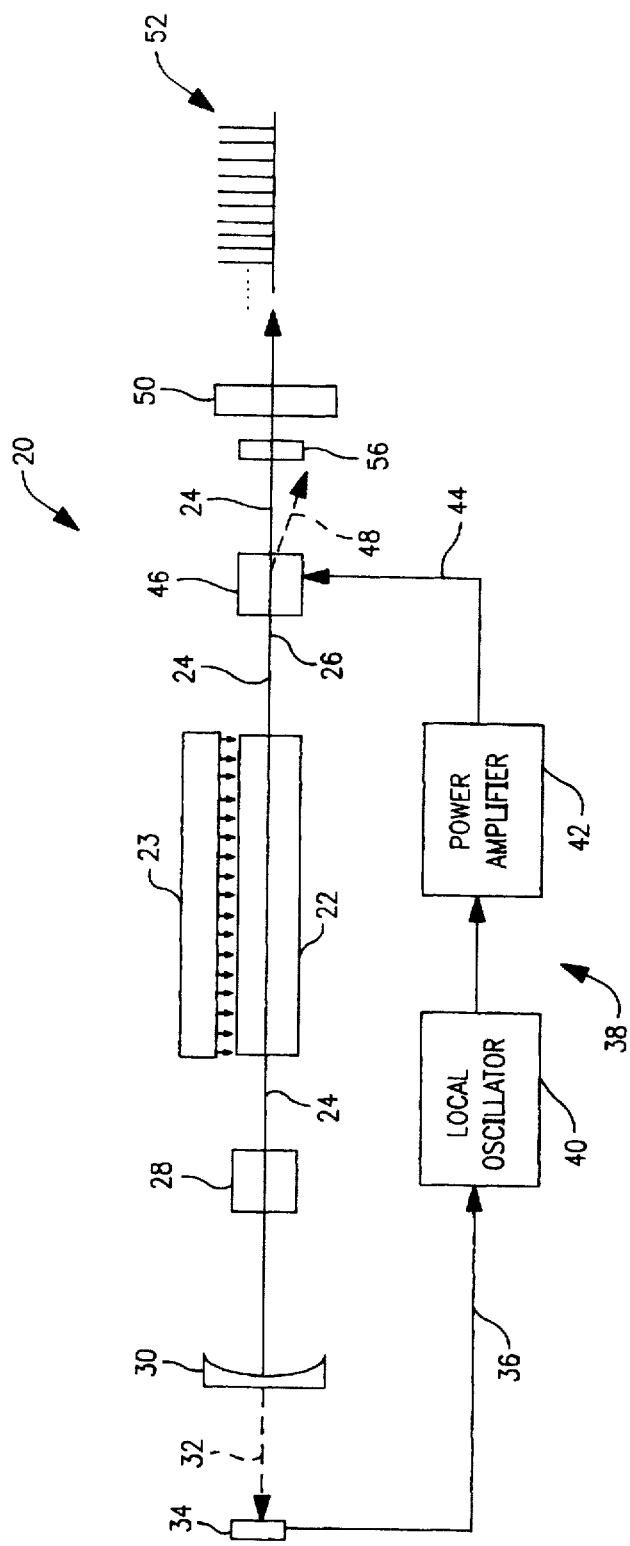
FIG. 3 is a schematic block diagram of the laser pumping system of the Raman laser system of FIG. 1.

Referring to FIG. 3, the laser pumping system 20 comprises a laser gain medium 22 which is pumped by a suitable pump source 23 such as diode lasers or a broadband lamp, to create a population inversion of excited state atoms. The laser gain medium 22 preferably comprises Nd:YAG which emits an input beam 24 at a major wavelength of about 1.064 microns. Thermal control of the laser gain medium 22 may be used to tune the frequency of the input beam 24.

During pumping of the laser gain medium 22, relaxation oscillations can occur in the input beam 24 unless the oscillations are suppressed. Relaxation oscillations produce individual intensity spikes having random amplitude, duration and spacing. These spikes are highly undesirable in the Raman laser system 10 in that they prevent the production of an input beam 24 having a smooth pulse of a selected intensity that is maintainable below the damage threshold level of the Raman medium 74 and the non-linear medium 92 inside the Raman resonator cavity 70.

The laser pumping system 20 comprises means for suppressing relaxation oscillations in the input beam 24. The input beam 24 oscillates along the optical axis 26. A mode locking device 28 is provided to generate mode-locked pulses of a short duration. The mode-locked pulses impinge on a plano-concave mirror 30 that is highly reflective (e.g., about 99.9%) at the wavelength of the input beam 24, so that only a small portion 32 of the input beam 24 is transmitted through the mirror 30.

The beam portion 32 is sampled using a photodetector 34, such as a photodiode operable at the wavelength of the beam portion 32. The photodetector 34 converts the beam portion 32 to a proportional electrical signal 36. The photodetector 34 senses the intensity of the beam portion 32 for intensity fluctuations. Such intensity fluctuations characterize the onset of relaxation oscillations in the input beam 24 due to the cyclic buildup of the net gain in the laser gain medium 22.

The electrical signal 36 is used as feedback to modulate a radio frequency (RF) drive 38 electrically connected to the photodetector 34 and to an acousto-optic modulator 46. The RF drive 38 comprises a local oscillator 40 and a power amplifier 42 for converting the electrical signal 36 to a usable RF signal 44. The RF signal 44 drives the acousto-optic modulator 46 to rapidly modulate the intensity of the input beam 24 each time the photodetector 34 senses an intensity increase indicating the onset of a relaxation oscillation. To achieve adequate suppression of intensity induced spiking, the delay time between the photodetector 34 and the driving of the acousto-optic modulator 46 is much smaller than the spike width. The acousto-optic modulator 46 scatters a portion 48 of the input beam 24 to cause a corresponding loss in the input beam 24. As the portion 48 of scattered light increases relative to the transmitted input beam 24, the loss increases and the cavity quality factor, Q, decreases. The loss in the input beam 24 offsets the gain buildup in the laser gain medium 22 to suppress the relaxation oscillation. Once several relaxation oscillations have been suppressed, the laser pumping system 20 tends to damp down to the steady state intensity level. Thus, by rapidly modulating the loss and Q, relaxation oscillations are suppressed, enabling the laser pumping system 20 to produce pulses of substantially constant power.

Constant power pulses enable high efficiency over a long, mode-locked pulse train. The suppression of relaxation oscillations also enables the Raman medium 74 and the non-linear medium 92 to be irradiated at a high intensity for enhanced conversion efficiency, as the intensity is maintainable at a level safely below the damage threshold level for the Raman medium 74 and the non-linear medium 92. This allows the efficiency of the Raman laser system 10 to be maximized without the risk of damage.

The transmitted input beam 24 is extracted from the cavity of the laser pumping system 20 by an output coupler 24 which is transmissive at the wavelength of the input beam 24. The input beam 24 comprises a mode-locked pulse train as depicted at 52. The mode-locked pulses are particularly suitable for guide star applications using sodium yellow light.

As shown in FIG. 3, the laser pumping system 20 preferably comprises an etalon 56 or a like frequency selecting element having a narrower transmission bandwidth than the gain bandwidth of the laser pumping system 20. The orientation of the etalon 56 is variable to selectively tune the frequency of the input beam 24. The etalon 56 enables the input beam 24 to be finely tuned about the frequency of about 1.064 microns to allow the Raman laser system 10 to operate at the peak Raman gain level. The etalon 56 typically has a thickness of about 250 microns and comprises nominal 50% reflectivity coatings applied to opposed sides.

The input beam 24 as tuned by the etalon 56 is reflected by a planar mirror 58 and then by a planar mirror 60. The twice-reflected input beam 24 is directed to a double convex lens 62 which focuses and transmits the input beam 24. The lens 62 is preferably coated with an anti-reflective coating to provide high transmission at the input beam 24 wavelength. The transmitted input beam 24 is then directed to a synchronously pumped Raman resonator cavity 70 to convert the frequency of the input beam 24. As used herein, the term "synchronously pumped" refers to the use of a Raman resonator cavity 70 that has a cavity round trip time equal to the laser pumping system 20 cavity round trip time such that the Raman converted pulses always overlap with a pump pulse in the Raman crystals 74 as described below.

The resonator cavity 70 preferably has a bow tie configuration as shown, to provide efficient conversion of the input beam 24 to an output beam. The bow tie resonator cavity 70 is also capable of maintaining the TEM$_{00}$ mode of the input beam 24, which is particularly useful in guide star applications.

The input beam 24 is directed to a plano-concave input mirror 72 of the resonator cavity 70. The mirror 72 is highly transmissive to the wavelength of the input beam 24. The position of the mirror 72 is adjusted relative to the focus of the lens 62 to mode match the input beam 24 into the resonator cavity 70. The input beam 24 makes a single pass through a solid, non-linear Raman medium. The Raman medium may be a single crystal, or more than one crystal such as the pair of non-linear Raman crystals 74. The Raman crystals 74 are selected to provide an adequate gain to overcome the losses incurred in the resonator cavity 70. This is achieved by selecting a Raman medium having a suitable gain coefficient and using a sufficient length of the Raman material. The input beam 24 stimulates scattering in the Raman crystals 74 to generate a Raman beam 76 at a frequency (and wavelength) shifted by a characteristic amount from that of the input beam 24.

The Raman crystals 74 are preferably comprised of calcium tungstate ($CaWO_4$), which has a Raman gain coefficient of about 2 cm/GW and is highly transparent at the about 1.064 micron wavelength of the input beam 24. Stimulated scattering of the input beam 24 within the calcium tungstate crystals 74 produces a Raman beam 76 having a greater wavelength and a lower frequency than the input beam. For the about 1.064 micron input beam 24, the Stokes wavelength of the Raman beam 76 equals about 1.178 microns. The Stokes wavelength equals twice the wavelength of yellow light. The frequency of the Stokes wavelength of the Raman beam 76 is predominantly at the first Stokes wavelength, although other Stokes and anti-Stokes order transitions are also produced within the Raman crystals at a lower intensity than the first Stokes wave.

According to the present invention, other solid state Raman materials may be used. Such other Raman materials include potassium dyhydrogen phosphate (KDP), KD*P and the like.

Figure 4:
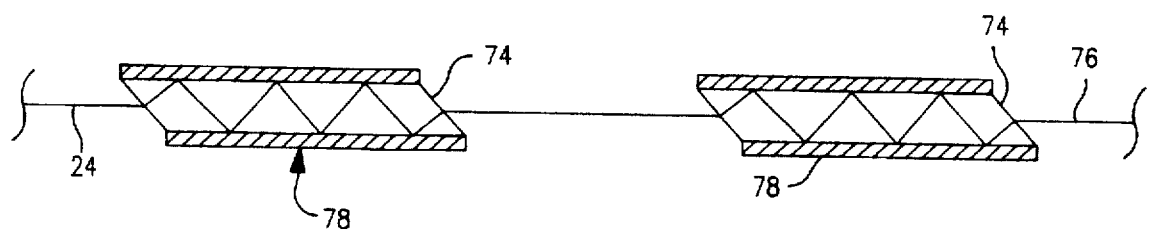
FIG. 4 is an enlarged view illustrating an alternative Raman medium zig-zag slab configuration and the use of thermal control elements for controlling the Raman medium temperature.

The Raman crystals 74 may have a zig-zig slab geometry as shown in FIG. 4 to minimize thermal distortions. In addition, thermal control means may be used to control the temperature of the Raman crystals 74. The thermal control means may comprise a cooling element 78 positioned proximate to each of the opposed major faces of the slab. Other thermal control means such as coolant channels (not shown) for flowing a coolant over the major side faces of the Raman crystals 74 may be optionally be used. Edge bar thermal control elements (not shown) may be used to control the temperature at the side faces of the Raman crystals 74.

In addition to preventing thermal distortion of the Raman crystals 74, thermal control may be used to control the Raman shift to tune the frequency of the Raman beam 76. This method of frequency control may be impractical in some instances, however, due to the relative insensitivity of Raman materials to temperature change. For example, the Raman shift of calcium tungstate varies about 0.74 GHz/°C., and so a temperature increase of 760° C. is required to shift the frequency by about 100 GHz.

The Raman shifted beam 76 impinges upon a planoconcave mirror 80 transmissive to residual about 1.064 micron waves passing through the Raman crystals 74, and highly reflective at about 1.178 microns. The mirror 80 reflects the Raman beam 76 to a totally reflective, planoconcave mirror 82.

The Raman beam 76 is reflected from the mirror 82 and impinges on a first frequency selection element, which is preferably an etalon 84 or the like. The etalon 84 has a narrower transmission bandwidth than the gain bandwidth of the Raman crystals 74. The orientation of the etalon 84 is adjustable to selectively tune the frequency of the Raman beam 76. The etalon 84 enables the Raman beam 76 to be finely tuned to limit oscillation within the resonator cavity 70 to a very narrow range of wavelengths within the bandwidth of the Raman crystals 74 and, particularly, to the first Stokes wavelength at about 1.178 microns for the calcium tungstate crystals 74. The etalon 84 typically has a thickness of about 240 microns and is preferably coated with a partially-reflective coating having a nominal 50% reflectivity at about 1.178 microns.

Figure 2:
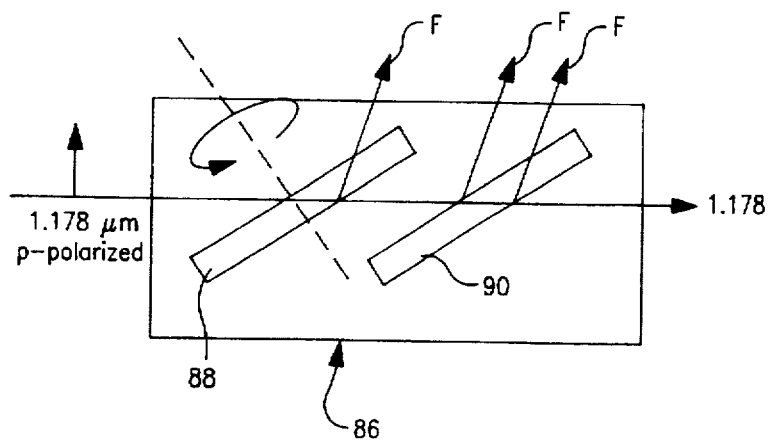
FIG. 2 is an enlarged view illustrating the interaction of the Raman shifted beam with the birefringent filter and uncoated plate of the Raman laser system of FIG. 1.

The Raman laser system 10 preferably comprises a second frequency selection element 86 for tuning the frequency of the Raman beam 76. As shown in greater detail in FIG. 2, the Raman beam 76 is p-polarized after passing the etalon 84. The Raman beam 76 is directed to a birefringent filter 88 which provides coarser wavelength tuning than the etalon 84. The birefringent filter 88 is rotated as shown to produce Fresnel reflections, F, at other wavelengths close to the first Stokes shifted wavelength. These other wavelengths correspond to higher Raman order transitions produced during the SRS process. The birefringent filter 88 removes these other wavelengths from the Raman beam 76 so that they do not decrease the intensity of the about 1.178 micron wavelength.

The respective positions of the etalon 84 and the birefringent filter 88 in the resonator cavity 70 may be reversed.

The second frequency selection element 86 preferably also comprises a polarizing element such as an uncoated plate 90 to provide additional frequency discrimination of the Raman beam 76. The uncoated plate 90 is oriented at the Brewster angle to allow light waves of the desired polarization to be preferentially transmitted and to reflect other light waves as shown. The reflected wavelengths suffer losses, while the transmitted wavelength does not. Consequently, the gain of the transmitted wavelength is amplified more than for the other wavelengths so that the Raman beam 76 comprises p-polarized light.

The Raman laser system further comprises a non-linear medium for shifting the frequency of the Raman beam 76. The non-linear medium is preferably a doubler crystal 92 which generates a second harmonic having a wavelength equal to one-half the Raman beam 76 wavelength, and a corresponding frequency twice that of the Raman beam 76. The non-linear medium may optionally comprise a sum-and-difference frequency generator to generate other selected wavelengths from the Raman beam 76.

The doubler crystal 92 is preferably composed of a non-critically phase-matched type I crystal. Suitable doubler materials include crystals such as lithium triborate (LBO), lithium tetraborate (LTBO), cesium lithium hexaborate (CLBO), beta barium borate (BBO), potassium titanyl phosphate (KTP) and KTP isomorphs including potassium titanyl arsenate (KTA), rubidium titanyl arsenate (RTA), rubidium titanyl phosphate (RTP) and potassium dideuterium phosphate (KD*P).

For a Nd:YAG laser pumping system 20, calcium tungstate Raman crystals 74 and an LBO doubler crystal 92, the second harmonic has a wavelength of about 0.589 microns, equalling the wavelength of sodium yellow light.

The doubler crystal 92 is preferably maintained at an effective temperature so that it remains non-critically phase matched with the Raman beam 76 at a temperature of about 40° C.

The frequency doubled beam generated by the doubler crystal 92 impinges on an output coupling mirror 94. A dichroic coating is preferably applied to the output coupling mirror 94 to make it highly transmissive only to the wavelength of about 0.589 microns, and reflective to the wavelength of the Raman beam 76. This ensures that the output beam 96 substantially comprises light waves having the wavelength of sodium yellow light. The non-transmitted wavelength is reflected back into the resonator cavity 70 along the arm 98, increasing the intensity of the Raman beam 76 and increasing the efficiency of producing the output beam 96.

The present invention provides a highly efficient Raman laser system for generating different laser wavelengths from an input beam. The laser pumping system 20 emits an input beam 24 having a constant power, mode-locked pulse train with the suppression of relaxation oscillations. Synchronous pumping of the resonator cavity 70 produces high gain because the Raman shifted beam 76 makes many passes through the gain region to produce high amplification. The present invention can utilize an input beam 24 having a peak power that is too low to produce Raman shifting in other system configurations in which the Raman beam makes only a single pass through the gain region and does not achieve the necessary intensity to stimulate scattering.

The bow-tie resonator cavity 70 configuration maintains short mode-locked pulses. The input beam 24 and the Raman beam 76 achieve high intensities, increasing the Raman shifting efficiency in the Raman crystals 74 and the frequency shifting efficiency in the doubler crystal 92. Consequently, the efficiency of converting the input beam 24 to the output beam 96 is enhanced.

The present invention has been described in considerable detail with reference to certain preferred embodiments thereof, however, other embodiments are possible. Therefore, the spirit and scope of the appended claims should not be limited to the description of the preferred embodiments contained herein.

What is claimed is:

1. A high efficiency Raman laser system, the system comprising:
   laser pumping means for generating an input beam, the laser pumping means including a laser cavity and stabilizing means disposed inside the laser cavity for suppressing relaxation oscillations in the input beam;
   a resonator cavity;
   an input coupler for inputting the input beam into the resonator cavity;
   a solid Raman medium disposed inside the resonator cavity for shifting the frequency of the input beam to produce a Raman beam;
   a solid, non-linear medium disposed inside the resonator cavity for shifting the frequency of the Raman beam to produce an output beam; and
   an output coupler for extracting the output beam from the resonator cavity.

2. The Raman laser system of claim 1, wherein the stabilizing means comprises sensing means for sensing the intensity of the input beam inside the laser cavity, and loss modulating means electrically connected to the sensing means for rapidly modulating the loss of the input beam inside the laser cavity responsive to the sensed intensity to suppress relaxation oscillations in the input beam.

3. The Raman laser system of claim 1, further comprising a first frequency selection means disposed inside the resonator cavity for selecting the frequency of the Raman beam to a first bandwidth.

4. The Raman laser system of claim 3, further comprising a second frequency selection means disposed inside the resonator cavity for tuning the frequency of the Raman beam to a second bandwidth narrower than the first bandwidth.

5. The Raman laser system of claim 4, wherein the non-linear medium shifts the frequency of the Raman beam as tuned by the first frequency selection means and the second frequency selection means to produce the output beam.

6. The Raman laser system of claim 5, wherein the non-linear medium comprises a frequency doubling medium.

7. The Raman laser system of claim 6, wherein the frequency doubling medium comprises a material selected from the group consisting of LBO, LTBO, CLBO, KTP, KTA, RTA, RTP, BBO and KD*P.

8. The Raman laser system of claim 5, further comprising a polarizing element disposed inside the resonator cavity for selecting the polarization of the Raman beam.

9. The Raman laser system of claim 1, further comprising a birefringent filter inside the resonator cavity for selecting the frequency of the Raman beam to a first bandwidth.

10. The Raman laser system of claim 9, further comprising an etalon inside the resonator cavity for selecting the frequency of the Raman beam to a second bandwidth narrower than the first bandwidth.

11. The Raman laser system of claim 1, wherein the non-linear medium comprises a frequency doubling medium.

12. The Raman laser system of claim 1, wherein the non-linear medium comprises a material selected from the group consisting of LBO, LTBO, CLBO, KTP, KTA, RTA, RTP, BBO and KD*P.

13. The Raman laser system of claim 1, wherein the laser pumping means comprises a Nd:YAG laser.

14. The Raman laser system of claim 1, wherein the laser pumping means comprises means for mode-locking the input beam.

15. The Raman laser system of claim 1, wherein the resonator cavity has a bow tie configuration.

16. The Raman laser system of claim 1, wherein the Raman medium comprises crystalline calcium tungstate.

17. The Raman laser system of claim 1, wherein the resonator cavity is configured to be synchronously pumped by the laser pumping means.

18. The Raman laser system of claim 1, wherein the input coupler comprises an input mirror highly transmissive to the input beam wavelength and highly reflective to the Raman beam wavelength.

19. The Raman laser system of claim 1, wherein the output coupler comprises an output mirror highly transmissive at the wavelength of the output beam and highly reflective at the wavelength of the Raman beam, whereby the output coupler reflects the wavelength of the Raman beam into the resonator cavity.

20. The Raman laser system of claim 1, wherein the laser pumping means comprises a Nd:YAG laser, the Raman medium comprises crystalline calcium tungstate, and the non-linear medium comprises a material selected from the group consisting of LBO, LTBO, CLBO, KTP, KTA, RTA, RTP, BBO and KD*P.

21. The Raman laser system of claim 1, wherein the Raman medium has a zig-zag slab geometry, and further comprising means for cooling the Raman medium to dissipate heat produced by the Raman process.

22. A high efficiency Raman laser system, the system comprising:
   a mode-locked solid state laser pumping system for producing an input beam, the laser pumping system including a laser cavity, a photodetector disposed inside the laser cavity for sensing the intensity of the input beam and generating a corresponding electrical signal, an RF drive disposed inside the laser cavity and electrically connected to the photodetector for generating an RF signal from the electrical signal, and an acousto-optic modulator disposed in the laser cavity and electrically connected to the RF drive for rapidly modulating the loss of the input beam responsive to the RF signal to suppress relaxation oscillations in the input beam;

a resonator cavity;

an input coupler for inputting the input beam into the resonator cavity;

a solid Raman medium disposed inside the resonator cavity for shifting the frequency of the input beam to generate a Raman beam;

a solid, non-linear medium disposed inside the resonator cavity for shifting the frequency of the Raman beam to produce an output beam; and an output coupler for extracting the output beam from the resonator cavity.

23. The Raman laser system of claim 22, further comprising an etalon disposed inside the resonator cavity for tuning the frequency of the Raman beam to a first bandwidth.

24. The Raman laser system of claim 23, further comprising a birefringent filter disposed inside the resonator cavity for selecting the frequency of the Raman beam to a second bandwidth broader than the first bandwidth.

25. The Raman laser system of claim 24, further comprising a polarizing element disposed inside the resonator cavity for selecting the polarization of the Raman beam.

26. The Raman laser system of claim 24, wherein the non-linear medium comprises a frequency doubling medium for doubling the frequency of the Raman beam as tuned by the etalon and the birefringent filter.

27. The Raman laser system of claim 22, wherein the non-linear medium comprises a frequency doubling medium for doubling the frequency of the Raman beam.

28. The Raman laser system of claim 22, wherein the laser pumping system comprises a Nd:YAG laser, the Raman medium comprises crystalline calcium tungstate, and the non-linear medium comprises a material selected from the group consisting of LBO, LTBO, CLBO, KTP, KTA, RTA, RTP, BBO and KD*P.

29. The Raman laser system of claim 22, wherein the resonator cavity has a bow tie configuration.

30. The Raman laser system of claim 22, wherein the input coupler comprises an input mirror highly transmissive to the input beam and highly reflective to the Raman beam wavelength.

31. The Raman laser system of claim 22, wherein the output coupler comprises an output mirror highly transmissive to the wavelength of the output beam and highly reflective to the wavelength of the Raman beam, whereby the output mirror reflects the wavelength of the Raman beam into the resonator cavity.

32. A method for shifting the frequency of a laser beam emitted by a laser pumping system, the method comprising the steps of:

generating an input beam inside a laser cavity of a laser pumping system;

sensing the intensity of the input beam in the laser cavity;

rapidly modulating the loss of the input beam in the laser cavity based on the sensed intensity to suppress relaxation oscillations in the input beam;

inputting the input beam into a resonator cavity;

shifting the frequency of the input beam using a solid Raman medium disposed inside the resonator cavity to produce a Raman beam;

shifting the frequency of the Raman beam using a solid non-linear medium disposed inside the resonator cavity to produce an output beam; and extracting the output beam from the resonator cavity.

33. The method of claim 32, wherein the step of sensing comprises sensing the intensity of the input beam inside the laser cavity using a photodetector which generates a corresponding electrical signal, and the step of rapidly modulating comprises rapidly modulating the loss of the input beam inside the laser cavity based on the electrical signal using an acousto-optic modulator electrically connected to the photodetector.

34. The method of claim 32, further comprising the step of selecting the frequency of the Raman beam to a first bandwidth using a first frequency selection element disposed inside the resonator cavity.

35. The method of claim 34, further comprising the step of tuning the frequency of the Raman beam to a second bandwidth narrower than the first bandwidth using a second frequency selection element disposed inside the resonator cavity.

36. The method of claim 35, wherein the first frequency selection element comprises a birefringent filter and the second frequency selection element comprises an etalon.

37. The method of claim 35, further comprising the step of selecting the polarization of the Raman beam using a polarization selection element disposed inside the resonator cavity.

38. The method of claim 35, wherein the step of shifting the frequency of the Raman beam comprises doubling the Raman beam frequency as tuned by the second frequency selection element to produce the output beam.

39. The method of claim 32, wherein the step of shifting the frequency of the Raman beam comprises doubling the Raman beam frequency to produce the output beam.

40. The method of claim 32, wherein the input beam is mode-locked, and the resonator cavity has a bow tie configuration.

41. The method of claim 32, wherein the laser pumping system comprises a Nd:YAG laser, the Raman medium comprises crystalline calcium tungstate, the non-linear medium comprises a material selected from the group consisting of LBO, LTBO, CLBO, KTP, KTA, RTA, RTP, BBO and KD*P, and the output beam has a wavelength of about 0.589 microns.

* * * * *